United States Patent Office 2,839,576
Patented June 17, 1958

2,839,576

PROCESS FOR THE PRODUCTION OF EPSILON-HALOCAPROIC ACIDS

Benjamin Phillips and Paul S. Starcher, Charleston, W. Va., assignors to Union Carbide Corporation, a corporation of New York No Drawing. Application November 23, 1955
Serial No. 548,753

12 Claims. (Cl. 260—539)

This invention relates to a process for the production of epsilon-halocaproic acids and has for an object the provision of a new and novel process for the production of epsilon-halocaproic acids in high yields. More particularly, this invention is directed to a process for the production of epsilon-halocaproic acids which comprises reacting an epsilon-caprolactone or a poly-epsilon-caprolactone and an anhydrous hydrogen halide in the presence of a Friedel-Crafts catalyst.

The process of this invention can be carried out at any convenient temperature as temperature is not narrowly critical. It has been found that the reaction can be conducted at temperatures in the range of from 50° C. to 225° C. The preferred temperature is in the range of from 80° C. to 175° C. and optimum reaction conditions are achieved when a temperature of 125° C. is employed.

The epsilon-caprolactones suitable for use as starting materials in carrying out the process of this invention comprise monomers and polymers of epsilon-caprolactones which in monomer form correspond to the general formula:

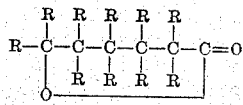

wherein R represents members selected from the group consisting of hydrogen atoms and alkyl groups.

A preferred class of either monomeric or polymeric epsilon-caprolactones suitable for use as starting materials in carrying out the process of this invention are those lactones corresponding to the general formula set forth above wherein R represents hydrogen atoms and alkyl groups and wherein the total number of carbon atoms contained in said alkyl groups does not exceed twelve.

Among the epsilon-caprolactones found suitable as starting materials, in either the monomeric or polymeric forms, are:

Alpha-methyl-epsilon-caprolactone
Beta-methyl-epsilon-caprolactone
Gamma-methyl-epsilon-caprolactone
Delta-methyl-epsilon-caprolactone
Epsilon-methyl-epsilon-caprolactone
Alpha-ethyl-epsilon-caprolactone
Beta-ethyl-epsilon-caprolactone
Gamma-ethyl-epsilon-caprolactone
Delta-ethyl-epsilon-caprolactone
Epsilon-ethyl-epsilon-caprolactone
Alpha,beta-dimethyl-epsilon-caprolactone
Alpha,gamma-dimethyl-epsilon-caprolactone
Alpha,delta-dimethyl-epsilon-caprolactone
Alpha,epsilon-dimethyl-epsilon-caprolactone
Beta,gamma-dimethyl-epsilon-caprolactone
Beta,delta-dimethyl-epsilon-caprolactone
Beta,epsilon-dimethyl-epsilon-caprolactone
Gamma,delta-dimethyl-epsilon-caprolactone
Gamma-epsilon-dimethyl-epsilon-caprolactone
Delta,epsilon-dimethyl-epsilon-caprolactone
Beta,beta,delta-trimethyl-epsilon-caprolactone
Beta,delta,delta-trimethyl-epsilon-caprolactone
Alpha,beta,gamma-trimethyl-epsilon-caprolactone
Alpha,beta,delta-trimethyl-epsilon-caprolactone
Alpha,beta,epsilon-trimethyl-epsilon-caprolactone
Beta,gamma,delta-trimethyl-epsilon-caprolactone
Beta,gamma,epsilon-trimethyl-epsilon-caprolactone
Gamma,delta,epsilon-trimethyl-epsilon-caprolactone
Alpha-ethyl-beta-methyl-epsilon-caprolactone
Alpha-ethyl-gamma-methyl-epsilon-caprolactone
Alpha-ethyl-delta-methyl-epsilon-caprolactone
Alpha-ethyl-epsilon-methyl-epsilon-caprolactone
Beta-ethyl-alpha-methyl-epsilon-caprolactone
Beta-ethyl-gamma-methyl-epsilon-caprolactone
Beta-ethyl-delta-methyl-epsilon-caprolactone
Beta-ethyl-epsilon-methyl-epsilon-caprolactone
Gamma-ethyl-alpha-methyl-epsilon-caprolactone
Gamma-ethyl-beta-methyl-epsilon-caprolactone
Gamma-ethyl-delta-methyl-epsilon-caprolactone
Gamma-ethyl-epsilon-methyl-epsilon-caprolactone
Delta-ethyl-alpha-methyl-epsilon-caprolactone
Delta-ethyl-beta-methyl-epsilon-caprolactone
Delta-ethyl-gamma-methyl-epsilon-caprolactone
Delta-ethyl-epsilon-methyl-epsilon-caprolactone
Epsilon-ethyl-alpha-methyl-epsilon-caprolactone
Epsilon-ethyl-beta-methyl-epsilon-caprolactone
Epsilon-ethyl-gamma-methyl-epsilon-caprolactone
Epsilon-ethyl-delta-methyl-epsilon-caprolactone
Alpha,alpha-dimethyl-epsilon-caprolactone
Beta,beta-dimethyl-epsilon-caprolactone
Gamma,gamma-dimethyl-epsilon-caprolactone
Delta,delta-dimethyl-epsilon-caprolactone
Alpha,alpha,delta-trimethyl-epsilon-caprolactone
Beta,beta,gamma-trimethyl-epsilon-caprolactone
Gamma,gamma,epsilon-trimethyl-epsilon-caprolactone
Delta,delta,alpha-trimethyl-epsilon-caprolactone
Beta,beta-dimethyl-gamma-ethyl-epsilon-caprolactone
Delta,delta-dimethyl-alpha-ethyl-epsilon-caprolactone As disclosed hereinbefore, the process of this invention comprises reacting an epsilon-caprolactone or a poly-epsilon-caprolactone and an anhydrous hydrogen halide in the presence of a Friedel-Crafts catalyst. The anhydrous hydrogen halides suitable for use in converting the epsilon-caprolactones to epsilon-halocaproic acids are the hydrogen chlorides, bromides, fluorides and iodides.

The Friedel-Crafts catalysts which have been found particularly suitable in accelerating the reaction are Friedel-Crafts catalysts of the metal halide type and include aluminum chloride, ferric chloride, stannic chloride, antimony pentachloride, zinc chloride, and the like.

The amount of Friedel-Crafts catalyst necessary to effect the reaction also is not narrowly critical and a concentration of catalyst in the range of from 1 to 5 percent by weight based on the weight of the lactone will suffice. The preferred concentration of catalyst is about 3 percent by weight based on the lactone.

The time of reaction may vary from a few hours to as much as a day, depending on the reaction conditions. Most desirably, conditions are adjusted so as to complete the reaction in about four to nine hours.

The following examples illustrate and describe processes involving the production of epsilon-halocaproic acids in accordance with the invention.

EXAMPLE 1

Preparation of epsilon-chlorocaproic acid

A mixture of 114 grams of epsilon-caprolactone and 5.7 grams of zinc chloride was charged to a reaction flask and heated to 60° C. Anhydrous hydrogen chloride was introduced into the flask, with stirring, below the liquid level of the lactone. After 3.75 hours, 6 grams of hydrogen chloride had been absorbed. The temperature was thereupon raised to 80° C. and additional hydrogen chloride was added to the reaction mixture, with stirring, for an additional three hours at which time a total of 18 grams of hydrogen chloride had been absorbed. The reaction mixture, after standing overnight at room temperature, was diluted with an equal volume of ethyl ether and washed twice with a saturated aqueous ammonium chloride solution to remove zinc chloride. The oil was then dried with calcium chloride, and distilled under reduced pressure. The distillation afforded 57 grams of epsilon-chlorocaproic acid, which corresponded to a 38 percent yield, based on the epsilon-caprolactone. The product was characterized by the following physical properties:

Boiling point at 2.0 mm. Hg=113° C.
Refractive index $(n_D^{30})=1.4524$

EXAMPLE 2

*Preparation of epsilon-chlorocaproic acid*

A mixture of 228 grams of epsilon-caprolactone and 11.4 grams of anhydrous zinc chloride was heated to 100° C. with stirring and anhydrous hydrogen chloride was introduced below the liquid level of the lactone over a period of 7.5 hours. At this point, 54 grams of hydrogen chloride had been absorbed. The temperature of the reaction mixture was then raised to 125° C. and anhydrous hydrogen chloride was bubbled through the mixture for an additional four hours. The hydrogen chloride absorption at the end of this period of time was 72 grams which corresponded to 98.5 percent of the theoretical. The crude reaction mixture was diluted with an equal weight of chloroform and washed three times with water. An oil layer separated; the oil layer was then distilled under vacuum in a one-plate column to yield 258 grams of crude epsilon-chlorocaproic acid having a neutral equivalent of 153 (theoretical 150.5). The yield was 86 percent of theoretical.

The crude acid was purified by fractional distillation to yield pure epsilon-chlorocaproic acid having the following properties:

Boiling point at 3 mm. Hg=121° C.
Refractive index $(n_D^{30})=1.4515$
Neutral equivalent=150.7 (calculated 150.5)
Carbon (percent)=47.74 (calculated 47.8)
Hydrogen (percent)=7.33 (calculated 7.31)
Chlorine (percent)=23.64 (calculated 23.6)

EXAMPLE 3

*Preparation of epsilon-chlorocaproic acid*

A mixture of 228 grams of epsilon-caprolactone and 2.3 grams of anhydrous zinc chloride was treated with hydrogen chloride in a manner similar to that described in Example 2. After a 7-hour reaction period of 125° C., the temperature was raised to 140° C. for three hours and then to 150° C. for an additional seven hours. The reaction mixture was then diluted with chloroform, washed with water, and distilled under reduced pressure. The distillation afforded 226 grams of epsilon-chlorocaproic acid which corresponded to a yield of 75 percent of the theoretical based on the lactone.

EXAMPLE 4

*Preparation of epsilon-chlorocaproic acid*

A mixture of 228 grams of epsilon-caprolactone and 4.6 grams of zinc chloride was treated with a stream of anhydrous hydrogen chloride for a period of 6.5 hours at a temperature of 175° C. After working up the reaction mixture in a manner similar to that employed in Example 2, there was obtained 187 grams of epsilon-chlorocaproic acid which corresponded to a yield of 62 percent of the theory.

EXAMPLE 5

*Preparation of epsilon-chlorocaproic acid from the polyester of caprolactone*

A quantity (228 grams) of poly-epsilon-caprolactone, characterized as a light-tan waxy solid melting at about 45° C.–50° C., was mixed with 11.4 grams of anhydrous zinc chloride and heated to 125° C. Anhydrous hydrogen chloride was introduced below the liquid level of the molten mixture for a period of 11 hours, after which time the reaction mixture was diluted with chloroform, washed with water, and distilled under reduced pressure. There was obtained 219 grams of chlorocaproic acid which corresponded to a 73 percent yield based on the polyester. The epsilon-chlorocaproic acid had the following physical properties:

Boiling point at 3 mm. Hg=121° C.
Refractive index $(n_D^{30})=1.4515$
Neutral equivalent=150.7 (calculated 150.5)

EXAMPLE 6

*Preparation of epsilon-chloro-gamma-methylcaproic*

A mixture of 265 grams of gamma-methyl-epsilon-caprolactone and 5.1 grams of anhydrous zinc chloride was charged to a flask equipped with a gas inlet diffuser and stirrer and was heated to 70° C. Anhydrous hydrogen chloride was passed through the mixture for 4.25 hours at 70° C., for an additional 3 hours at 100° C., and for an additional 8 hours at 125° C. The reaction mixture showed a weight increase of 72 grams which was 98.6 percent of the theoretical weight increase.

The reaction mixture was diluted with 300 cc. of chloroform and washed with water to remove zinc chloride and any free hydrogen chloride. The oil layer was flashed on a one-plate column and then fractionated on a 2 ft. x 20 mm. column packed with glass helices. There was obtained a 72.1 percent yield (237 grams) of epsilon-chloro-gamma-methylcaproic acid, a colorless liquid boiling at 113° C. at 1.5 mm. Hg pressure and having a refractive index of 1.4551 $(n_D^{30})$. The purity, as judged by neutral equivalent was substantially 100 percent.

EXAMPLE 7

*Preparation of epsilon-chloro-trimethylcaproic acid*

A mixture of 234 grams of trimethyl-epsilon-caprolactone (a mixture of the beta,delta,delta- and beta,beta,delta-trimethyl-epsilon-caprolactones) and 11.8 grams of anhydrous zinc chloride was charged to a flask equipped was gas inlet diffuser, stirrer and condenser. The mixture was heated to 160° C. and anhydrous hydrogen chloride was bubbled through the liquid for a period of 13 hours. During this time, the temperature dropped (under reflux) from 160° C. to 105° C. There was a weight increase of 15 grams during the addition period (36.5 percent of theoretical).

The reaction mixture was diluted with 250 cc. of carbon tetrachloride and washed free of zinc chloride and hydrogen chloride. The oil layer was flashed away from residue and then fractionally distilled. There was obtained, in addition to some low boiling material and recovered lactone, a 23 gram cut boiling at 128° C. at 3 mm. Hg pressure and having a refractive index of 1.4632 $(n_D^{30})$. This cut had a purity of 82 percent by titration with base. Total yield of epsilon-chlorotrimethylcaproic acid (based on lactone), as judged by analysis of two cuts, was 8.5 percent.

EXAMPLE 8

*Preparation of epsilon-chloro-beta,delta-dimethylcaproic acid*

A mixture of 184 grams of beta,delta-dimethyl-epsilon-caprolactone and 9.2 grams of anhydrous zinc chloride was charged to a flask equipped with stirrer, gas inlet diffuser, and condenser and heated to 100° C. Anhydrous hydrogen chloride was bubbled through the reaction mixture for 2 hours at 125° C. At this time, the reaction mixture showed a weight increase of 30 grams (64 percent of the theoretical).

The reaction mixture was diluted with 250 cc. of carbon tetrachloride and washed free of zinc chloride and free hydrogen chloride with water. The oil layer was flashed away from residue and fractionally distilled under reduced pressure. There was obtained a 41.5 percent yield of epsilon-chloro-beta,delta-dimethylcaproic acid, a colorless liquid boiling at 121° C. at 3 mm. Hg pressure and having a refractive index of 1.4552–3 ($n_D^{30}$). The purity, as judged by neutral equivalent, was 95 percent.

What is claimed is:

1. A process for the production of an epsilon-halocaproic acid which consists of reacting an epsilon-caprolactone characterized by the structural formula:

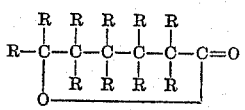

wherein R represents members selected from the group consisting of hydrogen and lower alkyl groups and an anhydrous hydrogen halide in the presence of a Friedel-Crafts catalyst.

2. A process for the production of an epsilon-halocaproic acid which consists of reacting an epsilon-caprolactone characterized by the structural formula:

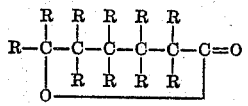

wherein R represents members selected from the group consisting of hydrogen and lower alkyl groups and an anhydrous hydrogen halide in the presence of a Friedel-Crafts catalyst at a temperature in the range of from 50° C. to 225° C.

3. A process for the production of an epsilon-halocaproic acid which consists of reacting an epsilon-caprolactone characterized by the structural formula:

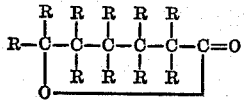

wherein R represents members selected from the group consisting of hydrogen and lower alkyl groups and anhydrous hydrogen chloride in the presence of a zinc chloride catalyst.

4. A process for the production of an epsilon-halocaproic acid which consists of reacting an epsilon-caprolactone characterized by the structural formula:

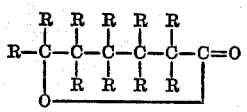

wherein R represents members selected from the group consisting of hydrogen and lower alkyl groups and anhydrous hydrogen chloride in the presence of a zinc chloride catalyst at a temperature in the range of from 50° C. to 225° C.

5. A process for the production of epsilon-chlorocaproic acid which consists of reacting epsilon-caprolactone and anhydrous hydrogen chloride in the presence of a zinc chloride catalyst.

6. A process for the production of epsilon-chloro-caproic acid which consists of reacting epsilon-caprolactone and anhydrous hydrogen chloride in the presence of a zinc chloride catalyst at a temperature in the range of from 50° C. to 225° C.

7. A process for the production of epsilon-chloro-gamma-methylcaproic acid which consists of reacting gamma-methyl-epsilon-caprolactone and anhydrous hydrogen chloride in the presence of a zinc chloride catalyst at a temperature in the range of from 50° C. to 225° C.

8. A process for the production of epsilon-chloro-trimethylcaproic acid which consists of reacting trimethyl-epsilon-caprolactone and anhydrous hydrogen chloride in the presence of a zinc chloride catalyst at a temperature in the range of from 50° C. to 225° C.

9. A process for the production of epsilon-chloro-trimethylcaproic acid which consists of reacting a mixture of beta,delta,delta- and beta,beta,delta-trimethyl-epsilon-caprolactones and anhydrous hydrogen chloride in the presence of a zinc chloride catalyst at a temperature in the range of from 50° C. to 225° C.

10. A process for the production of epsilon-chloro-beta,delta-dimethylcaproic acid which consists of reacting beta, delta-dimethyl-epsilon-caprolactone and anhydrous hydrogen chloride in the presence of a zinc chloride catalyst at a temperature in the range of from 50° C. to 225° C.

11. A process for the production of an epsilon-halocaproic acid which consists of reacting a polymer of an epsilon-caprolactone characterized by the structural formula:

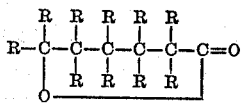

wherein R represents members selected from the group consisting of hydrogen and lower alkyl groups and an anhydrous hydrogen halide in the presence of a Friedel-Crafts catalyst.

12. A process for the production of an epsilon-halocaproic acid which consists of reacting a polymer of an epsilon-caprolactone characterized by the structural formula:

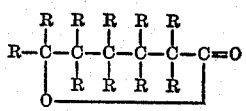

wherein R represents members selected from the group consisting of hydrogen and lower alkyl groups and an anhydrous hydrogen halide in the presence of a zinc chloride catalyst.

References Cited in the file of this patent

UNITED STATES PATENTS

| | | |
|---|---|---|
| 2,449,993 | Gresham et al. | Sept. 28, 1948 |
| 2,510,364 | Bankert | June 6, 1950 |
| 2,530,348 | Britton et al. | Nov. 14, 1950 |
| 2,587,540 | Shaver | Feb. 26, 1952 |

FOREIGN PATENTS

| | | |
|---|---|---|
| 71,260 | Netherlands | Nov. 15, 1952 |

OTHER REFERENCES

Van Natta et al., J. A. C. S., vol. 56 (1934), pp. 455–7.
Brown et al., J. A. C. S., vol. 66 (1944), p. 839.